United States Patent Office 2,938,153
Patented May 24, 1960

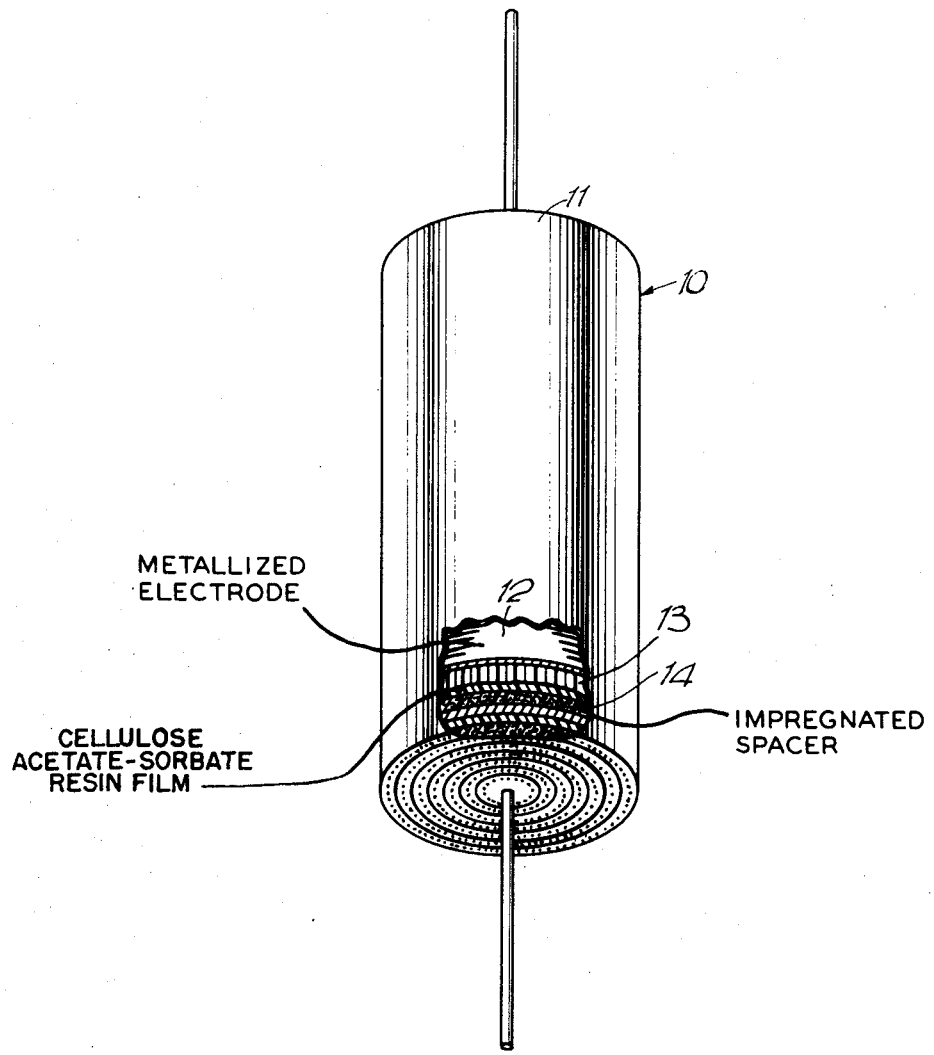

2,938,153
ELECTRICAL CAPACITORS

Paul H. Netherwood, Williamstown, Mass., assignor to Sprague Electric Company, North Adams, Mass., a corporation of Massachusetts Filed May 14, 1956, Ser. No. 584,760

12 Claims. (Cl. 317—258)

This invention relates to improved electrical capacitors and more particularly refers to metallized electrode capacitors.

Metallized paper capacitors have been known for many years and have come into greater use because of the increased emphasis on reliability, small size and other factors important in both commercial and military equipments. The usual metallized paper capacitor employs a paper base upon which a thin layer of resin is deposited from a solvent with the resin surface being used as a base for an evaporated zinc or aluminum deposit. This resin lacquer has been limited to relatively low melting materials in order to provide for better adherence of the resin for the deposited metal. Capacitors rolled with two such electrodes are normally impregnated with a wax or an oil. Numerous impregnants cannot be used with these capacitors because of the unpredictable resulting series resistance. As is well known the particular advantage of these capacitors resides in the fact that they are more or less self-healing; that is, a flaw in the dielectric spacing will result in "burning" away of the electrode metal from the immediate area of the fault.

This self-healing action, while theoretically perfect, does not in practice result in complete stability or maintenance of initial electrical characteristics. Minor capacitance loss may result and this is not usually of importance. However, it is found that a serious and usually permanent decrease of insulation resistance of the capacitor may be expected when the number of such self-healing actions is at all large. This lowering of insulation resistance leads to serious consequences at elevated temperatures since the resistance value of the path contributing to the lowered insulation resistance becomes sufficiently low to cause self-healing of the capacitor which in turn lowers the resistance even further, and often leads to complete failure of the capacitor. Whether or not this effect is due to localized melting of the dielectric material and resin is not known, but it appears to be a contributing factor.

It is an object of the present invention to overcome the foregoing related disadvantages. A further object is to produce new and improved metallized electrode capacitors. Additional objects will become apparent from the following description and claims.

These objects are attained in accordance with the present invention wherein there is produced a convolutely wound self-healing capacitor having two vapor-deposited metal strata each on a resin film supported on a porous matrix, said film comprising a resin obtained by the cross-linking of a substance from the group consisting of cellulose esters, cellulose ethers and vinyl compounds with a polyfunctional vinyl compound of the group consisting of divinyl benzene, tetrachlorodivinyl benzene, trivinyl benzene, polybutadiene-1,3, diallylphthalate, triallylphthalate, N,N'-methylene bisacrylamide and tetraethylene glycol dimethylacrylate. In a more restricted sense the invention is concerned with the aforesaid electrical capacitor in which the resin film is of a non self-supporting nature disposed upon a fibrous matrix which matrix is subsequently impregnated with a dielectric which includes both a liquid dielectric and in situ polymerized infusible thermoset resins.

According to my invention, I have discovered that the metallized electrode type capacitor can be made suitable for continuous operation at highly elevated temperatures and under substantial voltage gradients if the dielectric system is in its entirety of a solid state and infusible in nature. In its broadest concept, the dielectric may in part include a liquid substance such that each constituent of the dielectric, where more than one be used, is by itself, or in combination with another constituent, incapable of melting or of exercising any solvent action on any capacitor constituent and realize an extension of the operational life of an unpredictable magnitude.

The figure diagrammatically illustrates the construction of condensers made in accordance with this invention. A condenser 10 is shown diagrammatically having a casing 11 within which is contained in successive convolute windings a metallized electrode 12, a non-self-supporting resin film 13 on which the metallized electrode 12 is supported, and porous impregnated dielectric of cellulose forming a spacer 14 upon which the resin film is supported.

My invention is particularly directed to the so-called metallized paper capacitor. In the prior art, all systems with which I am familiar consisted of a paper spacer treated on one surface with a relatively low melting resin film, such as cellulose nitrate or cellulose acetate, which could be deposited from a solvent. On this resin film was metallized an electrode of zinc, aluminum or other metal. The deposited metal adhered readily as the particle temperature on deposition was sufficient to melt the resin. When such spacer-electrode combinations were wound or stacked together, the assembly was impregnated with an oil or preferably with a wax.

My structure departs entirely from the prior art in that the resin film used as a base for the metal electrode consists of an infusible material, thermosetting in nature and which can be used advantageously with an in situ polymerized infusible thermoset resin. Thus, the finished capacitor includes a solid state device in which thermal effects are substantially eliminated. I do not claim that my metal electrodes are not burned away or sparked away, but I have observed that the insulation resistance of the capacitor, particularly at elevated temperatures, and for extended periods of time, remains at a very high and safe level. Degradation products, if they are formed, do not migrate under any operating conditions. Thus in the case of a paper capacitor, I may operate at temperatures of 150° C. or higher, well above the operational temperature of any metallized paper capacitor of the prior art. I am also able to operate at voltage gradients in the neighborhood of 1500 to 2000 volts per mil even at elevated temperatures.

The sole drawing shows one capacitor construction of many, all known to the art, in which my invention is advantageously used. The convolutely wound assembly is of two porous spacers each carrying its respective resin film and metallized electrode as shown in the partly cut away view. The electrodes are margined on opposite sides and terminated to their respective lead wires by conventional metal sprayed ends of the sections. The porous spacers are impregnated with a dielectric material as a resin or oil.

Those resin materials which are suitable for use as base layers for the metallized electrodes and are deposited upon the fibrous spacer include cellulose ethers, cellulose esters and vinyl compounds preferably having a single functional vinyl group which materials are cross-linked by vinyl copolymerization with polyfunctional vinyl compounds. These polyfunctional vinyl compounds include divinyl and trivinyl benzene, tetrachlorodivinyl benzene and other similar substituted di and trivinyl benzenes, polybutadiene-1,3 of a liquid nature (having an average molecular weight of from 1000 to 3000), diallyl and triallyl phthalates and other polyesters including N,N'-methylene bisacrylamide and tetraethylene glycol dimethylacrylate. Further the hydroxy containing cellulose ethers and esters may be crosslinked with various diisocyanates such as tolylene-diisocyanate-2,4. Modified celluloses such as cellulose acetate-sorbate can be cross-linked by thermal means and/or peroxide catalysts and used to excellent advantage with this invention. Another cross-linking material advantageously used with the cellulose esters and ethers is dimethylol urea. The monofunctional vinyl compounds include styrene, dichlorostyrene, vinyl biphenyl, N-vinylcarbazole, vinyl-toluene and alphamethylstyrene, although there are many other suitable ones taught in the art. Monofunctional monomers alone are insufficient to change the basic character of the final polymer so as to produce a desired resinous film. Such films are generally non-self-supporting and have a thickness of .01 to less than 0.25 mil.

The fibrous or porous matrix upon which the resin film is deposited may consist of paper products made from cellulose or regenerated cellulose fibers, hemp, ramie or linen fibers, or other similar materials. Other materials include inorganic fibers, platelets, etc., as for example, asbestos, glass, itacolumite, mica paper and the like which are for the purposes of my invention infusible over the range of temperatures to be encountered. Also one can advantageously use this invention with resinous porous spacers such as porous polytetrafluoroethylene resin.

The porous matrix should be impregnated and preferably with a material possessing the desired and necessary infusibility. Numerous organic systems can be used for this latter purpose. Illustrative of these are the unsaturated polyester-vinyl monomer systems, in which an unsaturated bifunctional ester, such as diallyl-phthalate, propylene glycol maleate, etc., is copolymerized with styrene, halogenated styrene, N-vinyl pyrroles, vinyl naphthalene and other vinyl monomers to produce a thermoset resin. Another class of suitable resins comprise those produced by copolymerizing such vinyl monomers as these described immediately above with divinyl benzene, trivinyl benzene and other polyfunctional vinyl monomers, as well as halogenated or otherwise substituted derivatives thereof. Such in situ polymerizable impregnants are mixtures of polybutadiene-1,3 (average molecular weight 1500), vinyl toluene, divinyl benzene and polyalphamethylstyrene - styrene - divinylbenzene. Other suitable impregnants for use in the liquid state include polyisobutylene, chlorinated diphenyl and mineral oil.

This impregnation is normally conducted following winding, stacking or other assembly of the capacitor. The polymerization may be catalyzed by peroxides, ultraviolet neutron bombardment and/or heat, and may be accelerated by use of metal naphthenates, etc.

The thickness of the individual metallized electrodes is very small and ranges from about $10^{-4}$ to $10^{-6}$ inches. The electrode may be deposited by a number of means including chemical decomposition, gas decomposition, sputtering, etc., but preferably by vapor deposition in an atmosphere of much reduced pressure, for example, 10 microns. The metals employed include zinc, aluminum, silver, tin, lead, etc. For high temperature units, that is for operation at 150° C. and higher, aluminum or nickel should be used.

According to one of the preferred embodiments of my invention, the solid state capacitor is constructed with materials selected from the described types to give a substantially uniform voltage gradient throughout and across the dielectric spacing material. In this manner, unequal stresses are avoided and overall performance, through increased maximum voltages, may be achieved. As a typical example of this embodiment, I prepared a dielectric spacer consisting of a paper spacer with a density of 1.08 and impregnated with a propylene glycol maleate-styrene copolymer of dielectric constant such that the dielectric constant of the combined dielectric is 3.81. One surface of the paper is coated with a layer of thermally cross-linked cellulose acetate-sorbate, with a dielectric constant of 3.82. The coating mixture consisted of about 10% by weight of cellulose acetate-sorbate, said cellulose ester having a sorbyl degree of substitution of 0.03 and an acetyl degree of substitution of 2.44, dissolved in acetone containing 1% by weight of benzoyl peroxide. The lacquer was cured to insolubility by exposure to 150° C. overnight. The resulting dielectric after the copolymer impregnation can be employed in the metallized electrode capacitor structure and indeed in other foil type structures with improved results, particularly with respect to breakdown voltage. This is in distinct contrast to prior practice wherein not only do the constituents not conform to the infusible classification, but also wherein a discrepancy between dielectric constant of the resin film and the wax impregnated paper has existed.

The above indicated dielectric was metallized upon its cellulose acetate-sorbate surface with a thin conductive coating of aluminum of about $10^{-4}$ inches thickness by cathode sputtering.

A further embodiment of the invention is to deposit a metallized coating upon both sides of a porous dielectric material. Such a construction is obtained by coating the porous dielectric film (e.g., mica paper) with a substance which becomes infusible by thermal treatment, for example, 2,4-cellulose acetate-sorbate. The coated dielectric is then metallized on both sides with zinc coatings of about 2 microns thickness. These electrodes are margined on opposed sides to facilitate termination. The metallized dielectric is then convolutely wound into a capacitor structure with an additional porous spacer to prevent shorting. The unit is then impregnated, preferably with an in situ polymerizable resin, and thereafter converted into a solid infusible structure by thermal treatment. As a final step in the processing of this or other previously discussed units, after encasement in a container, the section can be impregnated with a dielectric oil or wax to eliminate any voids which conceivably might occur within the assembly. Alternatively, one can oil impregnate prior to the thermal or chemical cross-linking of the coating substance, and in fact bring about the former type of cross-linking by impregnation at elevated temperatures.

As a still further example of this invention, 0.25 mil thick paper was coated on one surface with a mixture of cellulose acetate-sorbate, sorbyl degree of substitution of 0.06 and acetyl degree of substitution of 2.49 (90 parts by weight), and N,N'-methylbisacrylamide (10 parts by weight) and thereafter heated at 130–150° C. over night to produce a thermally infusible lacquered cross-linked coating. Zinc metal was thereafter vapor deposited in a vacuum metallizing apparatus on the above treated paper to produce a composite metallized electrode and porous spacer. After appropriate margining of the paper, a capacitor section was produced by convolutely winding two metallized papers. The terminal lead wires were connected to the respective ends of the section by a lead-tin solder (50–50 by weight). The section was thereafter impregnated by standard vacuum techniques with a solution consisting of 40 parts by weight of polybutadiene (having an average molecular weight of 1500 and a viscosity of 10 cps at 25° C.); 48.5 parts by weight of vinyl toluene; 10 parts by weight of 55% divinyl benzene in a solution of ethylvinylbenzene; and, 1.5 parts by weight of ditertiary butyl peroxide. The unit was subjected to a temperature of 50° C. for 8 hours, 1 hour at 70° C., 5 hours at 80° C. and 12 hours at 120° C. to in situ polymerize the impregnant to a fusible state.

A further example of the invention utilizes a mixture of 85% by weight of cellulose acetate-sorbate and 15% by weight of divinyl benzene as the coating for the paper. Zinc electrodes are disposed on the coated side after coating has been cured over night at 130–150° C. After termination of the section as prepared above, the unit was impregnated with a solution of 35% by weight of liquid polyalphamethylstyrene (a low molecular weight polymer of alphamethylstyrene from the dimer to the octamer); styrene 60% by weight; divinyl benzene 5% by weight; and 2 parts by weight of a catalyst ditertiarybutyl peroxide. The section was cured for 8 hours at 150° C. to produce the finished capacitor. If desired, any of the above sections could be impregnated with a liquid dielectric as mineral oil or polyisobutylene having an average molecular weight of about 2000 to produce devices in accordance with this invention.

The reaction of the cellulose esters and ethers with a substituted urea such as dimethylolurea as previously set forth and N,N'-bis(methoxymethyl) urea effects a cross-linked product also within the scope of my invention. Comparable cross-linking of the cellulosics can also be obtained by reaction with esters of di or polybasic acids, substituted melamines, for example, N,N',N''-tris(ethoxymethyl) melamine, or by formation of disulfide bonds as by oxidation of a cellulosic Bunte salt and titanate esters.

One major advantage of the new metallized dielectric electrode film of this disclosure is that there is substantially no tendency for the resin substrata holding the metallic layer to be dissolved during impregnation. This particular item represented a serious problem with many prior art units in which a common lacquer was used as the immediate support for the metal layer.

As many apparently widely different embodiments of this invention may be made without departing from the spirit and scope thereof, it is to be understood that the invention is not limited to the specific embodiments hereof except as defined in the appended claims.

This application forms a continuation-in-part of my copending U.S. patent application, Serial No. 329,232, filed January 2, 1953, now abandoned.

What is claimed is:

1. A convolutely wound self-healing capacitor having two vapor-deposited metal strata each on a resin film disposed on a porous matrix, said film comprising a resin obtained by the cross-linking of a substance from the group consisting of cellulose esters, cellulose ethers and vinyl compounds with a polyfunctional vinyl compound of the group consisting of divinyl benzene, tetrachlorodivinyl benzene, trivinyl benzene, polybutadiene-1,3, diallylphthalate, triallylphathalate, N,N'-methylene bisacrylamide and tetraethylene glycol dimethylacrylate.

2. The combination of claim 1 in which said film is disposed upon paper.

3. The combination of claim 2 in which said matrix is impregnated with an infusible thermoset resin.

4. A concolutely wound self-healing capacitor having two vapor-deposited metal strata each on a resin film supported by a porous matrix, said film comprising thermally cross-linked cellulose acetate-sorbate containing a cross-linking agent.

5. The combination of claim 4 in which said film is disposed upon a paper spacer.

6. The combination of claim 5 in which said paper spacer is impregnated by a propylene glycol maleate-styrene copolymer.

7. A convolutely wound self-healing capacitor having two vapor-depositing metal strata, each on a resin film supported by a porous matrix, said film comprising a resin obtained by the cross-linking of a cellulose ester with divinyl benzene.

8. The capacitor of claim 7 in which said resin is of cellulose acetate-sorbate cross-linked by divinyl benzene.

9. A convolutely wound self-healing capacitor having two vapor-depositing metal strata, each on a resin film supported by a porous matrix, said film comprising a resin obtained by the cross-linking of a cellulose ester with tetrachlorodivinyl benzene.

10. A convolutely wound self-healing capacitor having two vapor-depositing metal strata, each on a resin film supported by a porous matrix, said film comprising a resin obtained by the cross-linking of a cellulose ester with styrene.

11. A convolutely wound self-healing capacitor having two vapor-depositing metal strata, each on a resin film supported by a porous matrix, said film comprising a resin obtained by the cross-linking of a cellulose ester with N-vinylcarbazole.

12. A convolutely wound self-healing capacitor having a non-self-supporting vapor-deposited stratum of metal on a smooth resin film deposited on a porous matrix, said film comprising a resin having a softening point above 150° C. obtained by the cross-linking of a substance from the group consisting of cellulose esters, cellulose ethers and vinyl compounds with a polyfunctional vinyl compound of the group consisting of divinyl benzene, tetrachlorodivinyl benzene, polybutadiene-1,3, diallylphthalate, triallylphthalate, N,N'-methylene bisacrylamide and tetraethylene glycol dimethylacrylate and a dielectric impregnant, said resin being inert to said impregnant.

References Cited in the file of this patent

UNITED STATES PATENTS

| | | |
|---|---|---|
| 1,745,400 | Brennecke | Feb. 4, 1930 |
| 2,155,590 | Garvey | Apr. 25, 1939 |